US009357396B2

(12) United States Patent
Okuno et al.

(10) Patent No.: US 9,357,396 B2
(45) Date of Patent: *May 31, 2016

(54) TERMINAL DEVICE

(71) Applicants: SONY CORPORATION, Tokyo (JP); SONY MOBILE COMMUNICATIONS INC., Tokyo (JP)

(72) Inventors: Takayoshi Okuno, Tokyo (JP); Takeaki Shimoe, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/738,514

(22) Filed: Jun. 12, 2015

(65) Prior Publication Data

US 2015/0358823 A1 Dec. 10, 2015

Related U.S. Application Data

(63) Continuation of application No. 13/617,188, filed on Sep. 14, 2012, now Pat. No. 9,071,970.

(60) Provisional application No. 61/566,730, filed on Dec. 5, 2011.

(51) Int. Cl.
*H04M 1/00* (2006.01)
*H04W 12/08* (2009.01)
(Continued)

(52) U.S. Cl.
CPC ............. *H04W 12/08* (2013.01); *G06F 3/0488* (2013.01); *G06F 3/04817* (2013.01); *H04M 1/67* (2013.01)

(58) Field of Classification Search
USPC .............. 455/550.1, 90.1, 565–566; 715/702, 715/741–747, 863, 864, 866
See application file for complete search history.

(56) References Cited

U.S. PATENT DOCUMENTS

2007/0150842 A1* 6/2007 Chaudhri ............ G06F 3/04883
715/863
2009/0006991 A1 1/2009 Lindberg et al.
(Continued)

FOREIGN PATENT DOCUMENTS

CN 1859447 A 11/2006
CN 101371258 A 2/2009
(Continued)

OTHER PUBLICATIONS
Extended European Search Report issued Apr. 18, 2013 in Patent Application No. 12186939.0.
(Continued)

*Primary Examiner* — Fayyaz Alam
(74) *Attorney, Agent, or Firm* — Oblon, McClelland, Maier & Neustadt, L.L.P

(57) ABSTRACT

A terminal device including an operation unit configured to receive an operation instruction performed by an external object; an operation disabling controller which performs control such that when the terminal device is in a disabled state, the operation instruction performed on the operation unit is ignored or the disabled state is cancelled; an operation detector which outputs, when a touch operation by the external object is detected, content of the touch operation as the operation instruction; an operation speed determination unit which determines whether a movement speed of the touch operation is higher than a predetermined threshold; and an operation controller which instructs the operation disabling controller to cancel the disabled state and control execution of a predetermined function when it is determined that the touch operation is an operation instruction to cancel the disabled state and in accordance with the movement speed of the touch operation.

18 Claims, 11 Drawing Sheets

(51) Int. Cl.
*G06F 3/0488* (2013.01)
*G06F 3/0481* (2013.01)
*H04M 1/67* (2006.01)

(56) References Cited

U.S. PATENT DOCUMENTS

| | | | |
|---|---|---|---|
| 2009/0007017 A1* | 1/2009 | Anzures | G06F 3/04883 715/835 |
| 2009/0241072 A1 | 9/2009 | Chaudhri et al. | |
| 2009/0267909 A1 | 10/2009 | Chen et al. | |
| 2009/0271703 A1 | 10/2009 | Chu et al. | |
| 2009/0271731 A1 | 10/2009 | Lin et al. | |
| 2009/0271783 A1 | 10/2009 | Hsieh et al. | |
| 2009/0288032 A1 | 11/2009 | Chang et al. | |
| 2010/0269040 A1 | 10/2010 | Lee | |
| 2010/0306718 A1 | 12/2010 | Shim et al. | |
| 2011/0296356 A1 | 12/2011 | Chaudhri et al. | |
| 2011/0316797 A1* | 12/2011 | Johansson | G06F 3/04883 345/173 |
| 2012/0023458 A1 | 1/2012 | Chaudhri et al. | |
| 2012/0124512 A1 | 5/2012 | Lindberg et al. | |
| 2012/0293438 A1 | 11/2012 | Chaudhri et al. | |
| 2013/0091468 A1* | 4/2013 | Xie | H04M 1/67 715/835 |
| 2014/0237378 A1* | 8/2014 | Gonen | H04M 1/72519 715/745 |

FOREIGN PATENT DOCUMENTS

| | | |
|---|---|---|
| CN | 101714057 A | 5/2010 |
| CN | 101788869 A | 7/2010 |
| CN | 101853125 A | 10/2010 |
| CN | 102449916 A | 5/2012 |
| EP | 2 224 323 A1 | 9/2010 |
| EP | 2 383 636 A1 | 11/2011 |
| WO | WO 2010/040670 A2 | 4/2010 |

OTHER PUBLICATIONS

Combined Chinese Office Action and Search Report issued Mar. 5, 2014 in Patent Application No. 201210517264.5 with English Translation.

Office Action issued Sep. 4, 2014 in European Patent Application No. 12186 939.0.

* cited by examiner

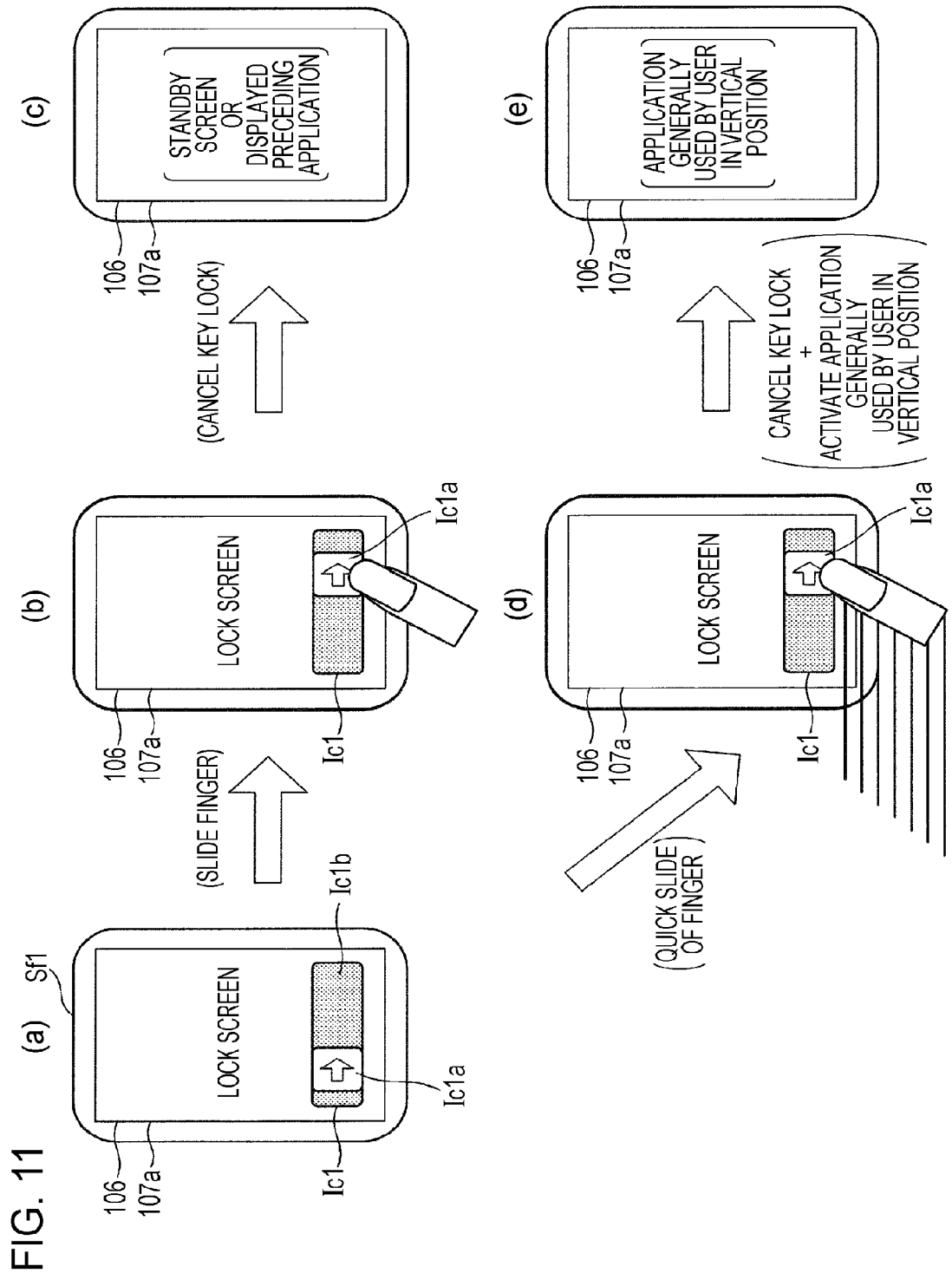

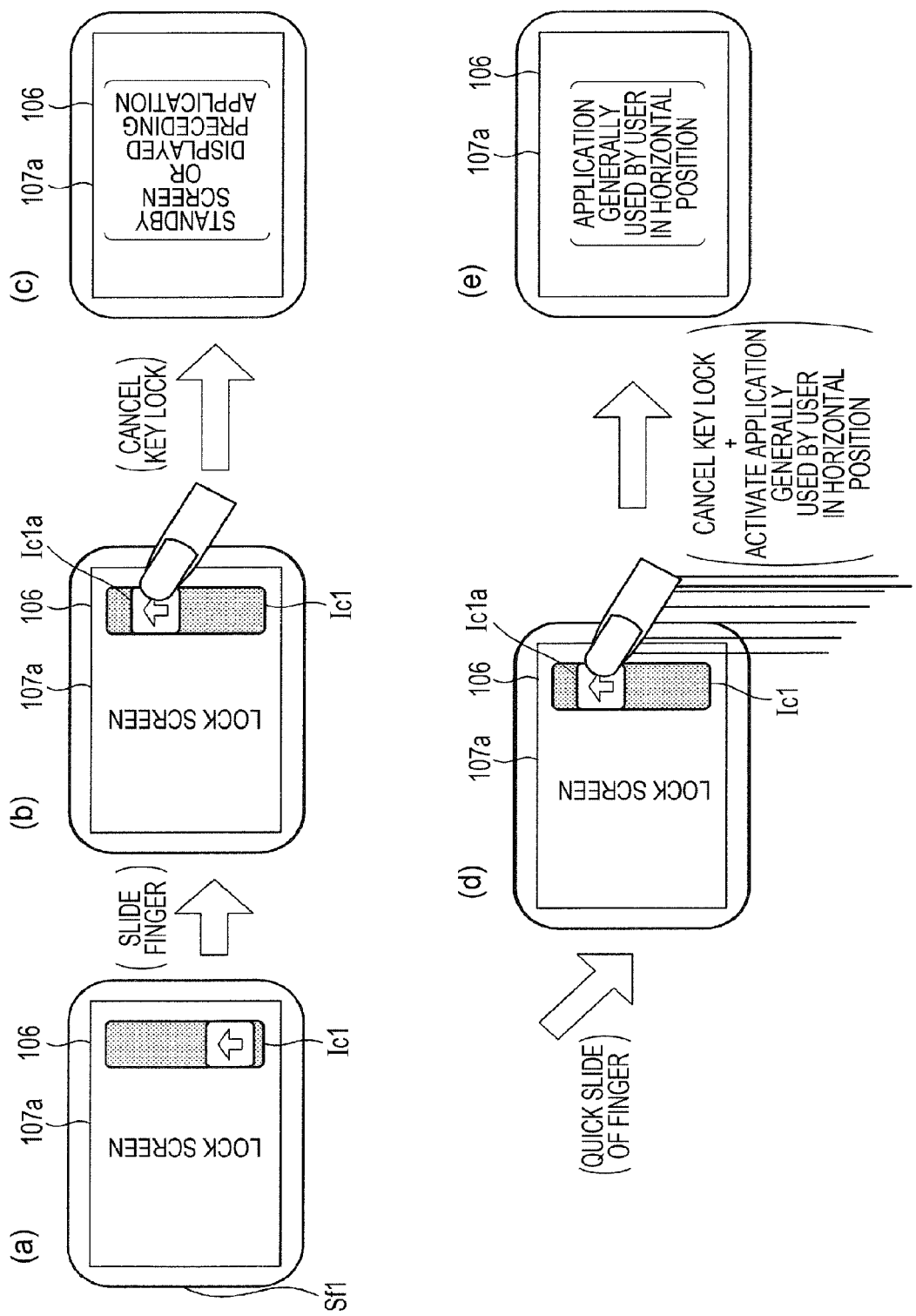

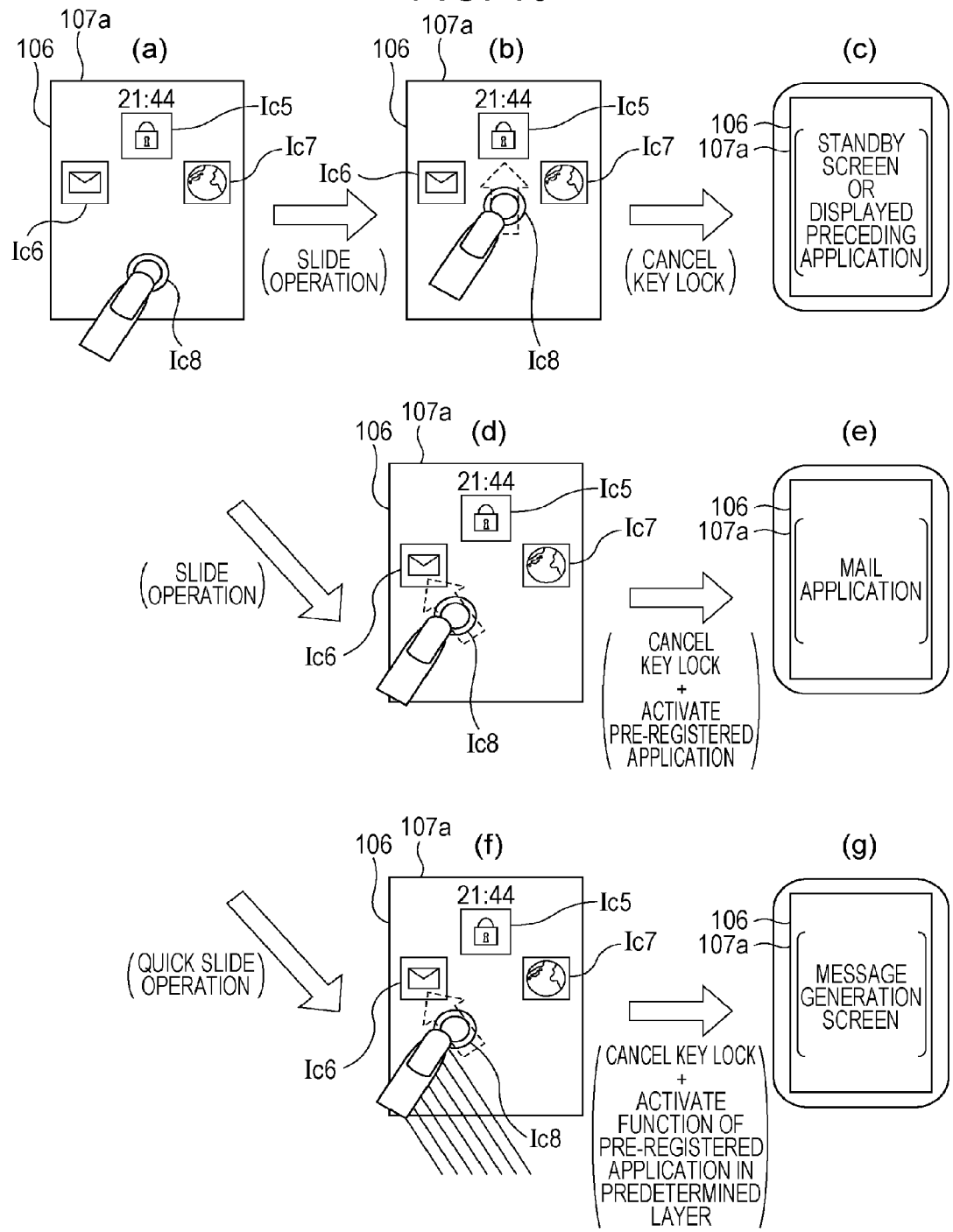

TERMINAL DEVICE

CROSS REFERENCE TO RELATED APPLICATIONS

This application is a continuation application of and claims the benefit of priority under 35 U.S.C. §120 from U.S. application Ser. No. 13/617,188, filed Sep. 14, 2012, which is related to and claims priority under 35 U.S.C. §119(e) to Provisional Application Ser. No. 61/566,730, filed Dec. 5, 2011, the entire contents of each of which is hereby incorporated herein by reference.

BACKGROUND

1. Field

The present disclosure relates to terminal devices suitably employed as cellular phone terminal devices, and more specifically, it relates to a technique of cancelling disabling state of an operation input using an operation unit.

2. Description of the Related Art

Hitherto, a key lock function is used to prevent keys of terminal devices such as cellular phone terminals included in bags or pockets of cloths from being unwillingly pressed and prevent the terminal devices from executing operations unexpected by a user. The key lock function disables content of an input operation even when a key operation such as a press of a key is performed. Also in a terminal device in which an operation input is performed not only by pressing a key but also by touching a touch panel using a user's finger or an instruction member such as a pen, an operation performed on the touch panel is disabled in a key lock state. The disablement of an operation performed on a touch panel is also referred to as "screen lock".

As a method for cancelling a key lock state or a screen lock state (hereinafter referred to as a "lock state"), a long press operation of a certain key, a method for performing a certain operation on a touch panel, and the like are known. When such an operation of cancelling a lock state is performed, the lock state is cancelled and a key operation or an operation performed on the touch panel is enabled. Then a screen referred to as a standby screen or a home screen is displayed. Instead of the standby screen, the home screen, or the like, a screen of an application which had been activated before the lock state may be displayed.

For example, Patent Literature 1 discloses a technique of storing a state of an execution of an application program when a key lock state is entered and restarting the execution of the application program in accordance with the execution state when the key lock state is cancelled.

CITATION LIST

Patent Literature

[PTL 1] Japanese Unexamined Patent Application Publication No. 2006-066974

Here, it is not necessarily the case that an application or a function that a user wishes to use after the lock state is the same as that had been executed before the lock. In this case, for example, the user should perform a step of retrieving a desired application from a menu screen or the like and activating the retrieved application. This is true for a case where the standby screen or the home screen is displayed when the lock is cancelled. Although the user performs an operation of cancelling the lock state in order to use a desired application or a desired function, a state before the lock state is entered is obtained when the lock is simply cancelled. Specifically, when the conventional method is employed, a user's demand "quicker use of a desired application or a desired function" is not satisfied.

The inventor of this application recognizes the need of further reduction of steps required to be performed by the user until the desired application of the desired function is activated when the lock state of the terminal device is cancelled.

BRIEF SUMMARY

A terminal device according to an embodiment of the present disclosure includes a an operation unit configured to receive an operation instruction performed by an external object; an operation disabling controller which performs control such that when the terminal device is in a disabled state, the operation instruction performed on the operation unit is ignored or the disabled state is cancelled; an operation detector which outputs, when a touch operation by the external object is detected, content of the touch operation as the operation instruction; an operation speed determination unit which determines whether a movement speed of the touch operation is higher than a predetermined threshold; and an operation controller which instructs the operation disabling controller to cancel the disabled state and perform control of execution of a predetermined function when it is determined that the touch operation is an operation instruction to cancel the disabled state and in accordance with the movement speed of the touch operation.

A method according to an embodiment of the present disclosure includes receiving, at an operation unit, an operation instruction performed by an external object; performing, at an operation disabling controller, control such that when the terminal device is in a disabled state, the operation instruction performed on the operation unit is ignored or the disabled state is cancelled; outputting, at an operation detector, when a touch operation by the external object is detected, content of the touch operation as the operation instruction; determining whether a movement speed of the touch operation is higher than a predetermined threshold; and instructing the operation disabling controller to cancel the disabled state and perform control of execution of a predetermined function when it is determined that the touch operation is an operation instruction to cancel the disabled state and in accordance with the movement speed of the touch operation.

According to an embodiment of this disclosure, when a movement speed of a slide operation performed by a user is higher than a predetermined threshold value, a disabling state is cancelled and a predetermined function which is selected from among functions of a terminal device and which is associated with the operation of the slide movement at a movement speed higher than the threshold value is executed. Accordingly, the number of operations to be performed to use the desired application or the desired function after a state in which an operation is disabled is cancelled may be considerably reduced.

BRIEF DESCRIPTION OF THE DRAWINGS

FIG. 11 is an explanatory diagram illustrating screen change performed in accordance with control of a lock controller according to the modification of the present disclosure.

FIG. 12 is an explanatory diagram illustrating screen change performed in accordance with control of the lock controller according to the modification of the present disclosure.

FIG. 13 is an explanatory diagram illustrating screen change performed in accordance with control of the lock controller according to the modification of the present disclosure.

DESCRIPTION OF EMBODIMENTS

Hereinafter, examples of a terminal device and an information processing method according to an embodiment of the present disclosure will be described in the following order with reference to the accompanying drawings. Note that, in the examples below, a description will be made taking a cellular phone terminal as an example of the terminal device.
1. Example of Configuration of Cellular Phone Terminal Device
2. Example of Processing of Lock Controller
3. Modifications
[1. Example of Configuration of Cellular Phone Terminal Device]

Figure 1:
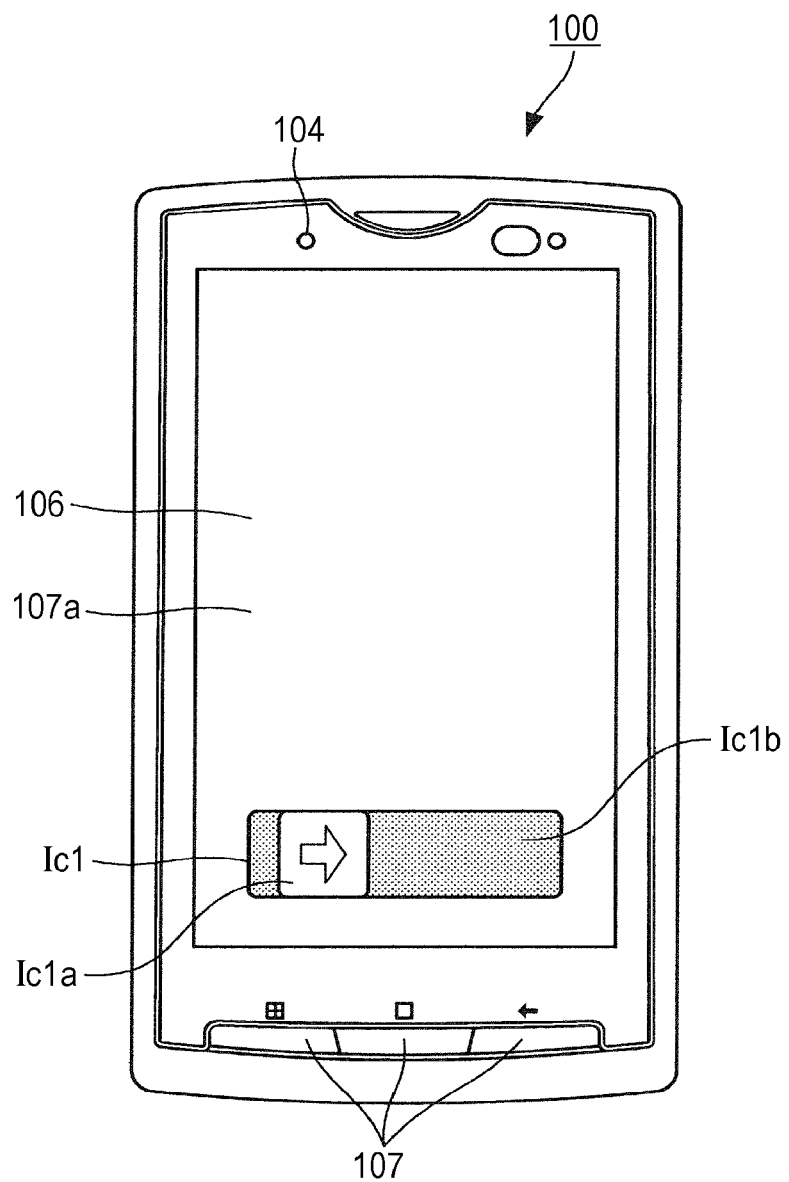
FIG. 1 is a diagram schematically illustrating a configuration of a cellular phone terminal device according to an embodiment of the present disclosure.

FIG. 1 is a diagram schematically illustrating a configuration of a cellular phone terminal device according to an embodiment of the present disclosure. A cellular phone terminal device 100 includes a speaker 104 which outputs an audio signal obtained by an audio processor, not shown, as audio, a display unit 106, and an operation unit 107. The display unit 106 includes a display panel such as an LCD (Liquid Crystal Display), a driving circuit (not shown), and the like. In this embodiment, a touch panel 107a is laminated on the display panel. Specifically, the display unit 106 also functions as the operation unit 107. As the touch panel 107a, an electrostatic capacitance touch panel may be used.

The touch panel 107a outputs information on a screen position where the screen is touched as operation information when detecting a touch by a user's finger or an instruction member. A touch panel controller 107b (refer to FIG. 2) generates an information signal. For example, when a so-called "flick" operation in which the touch panel 107a is touched by a finger or an instruction member and the finger or the instruction member is quickly moved away from the touch panel 107a in a flicking manner or a slide operation in which a finger or an instruction member is simply slid is performed, content of the operation is output as operation information. The operation information includes information representing that the content of the operation corresponds to a flick operation or a slide operation and information representing a speed of the flick operation or the slide operation. Specifically, the touch panel controller 107b functions as an operation detection unit. As the speed of the flick operation or the slide operation, an amount of a movement of a user's finger or an instruction member performed for a period of time from when the user's finger or the instruction member touches the touch panel 107a to when the user's finger or the instruction member leaves the touch panel 107a is detected, for example.

The operation unit 107 includes buttons in addition to the touch panel 107a. The buttons are disposed on a lower portion of the cellular phone terminal device 100, for example, as illustrated in FIG. 1.

In FIG. 1, an example of display of a screen of the display unit 106 in a state in which the cellular phone terminal device 100 is locked is shown. In a lower portion of the screen, a slide bar Ic1 representing the lock state of the cellular phone terminal device 100 is displayed. The slide bar Ic1 includes an arrow icon Ic1a and a bar portion (bar Ic1b) and is configured such that the icon Ic1a slides on the bar Ic1b to a position specified by the user's finger or the instruction member. Then, when an operation of sliding the icon Ic1a rightward on the bar Ic1b so that the icon IC1a reaches a right end of the bar Ic1b is performed, the lock state of the cellular phone terminal device 100 is cancelled.

The cellular phone terminal device 100 according to the embodiment of the present disclosure cancels the lock state and restores a state before the lock state when a speed of the slide operation performed on the slide bar Ic1 which is in the lock state is equal to or lower than a normal speed. For example, if an application had been operated before the lock state is entered, the application is restarted. Furthermore, if a function had been enabled before the lock state is entered, the function is enabled when the lock is cancelled. Alternatively, when the lock state is cancelled, the standby screen or the home screen may be displayed. That is, a preset operation is performed when the lock state is cancelled. Furthermore, when the speed of the slide operation performed on the slide bar Ic1 which is in the lock state is higher than the normal speed, an application preset by the user is activated or a predetermined function is turned on or off when the lock state is cancelled. The process performed when the lock state is cancelled will be described hereinafter in detail.

Figure 2:
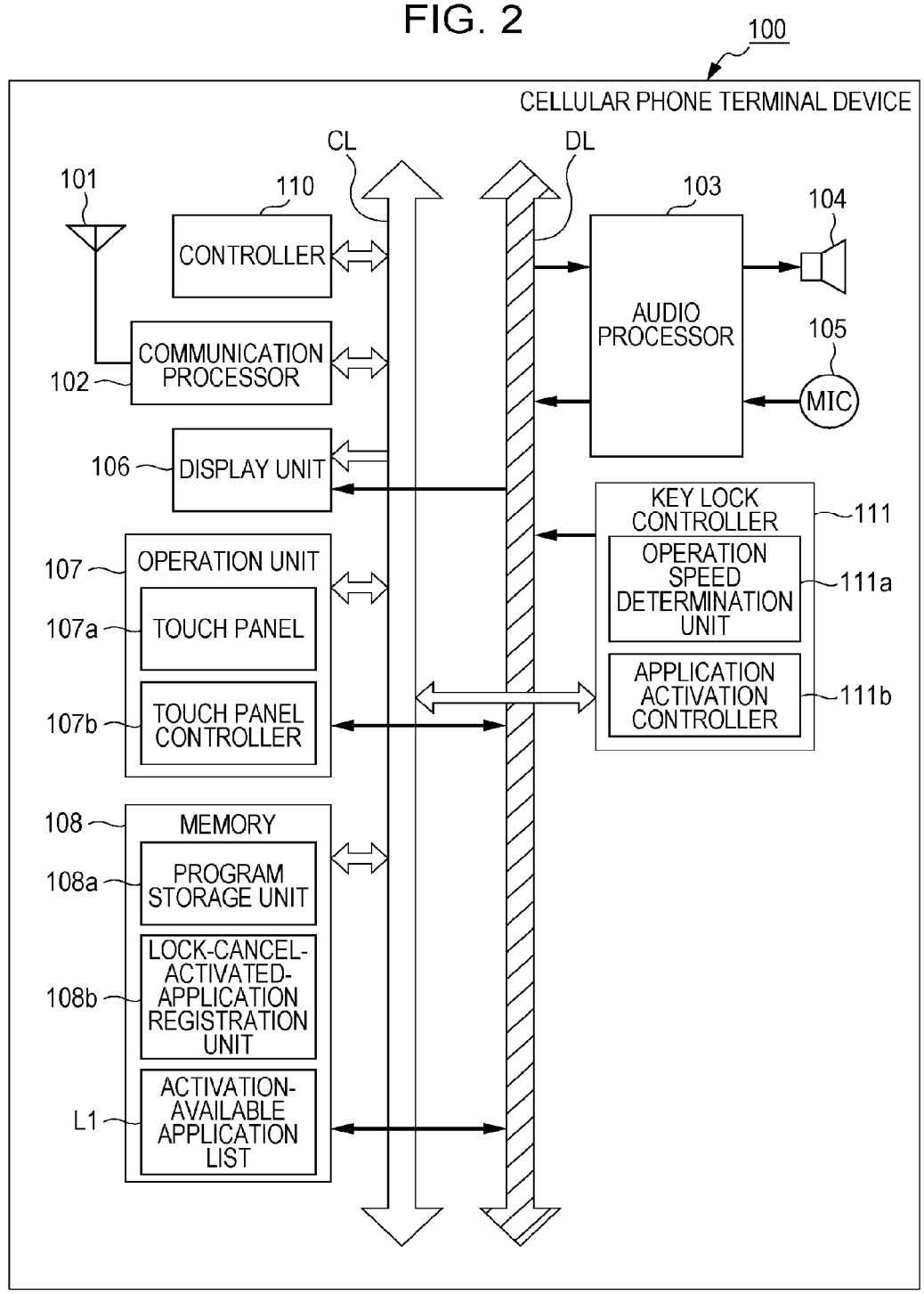
FIG. 2 is a block diagram illustrating an internal configuration of the cellular phone terminal device according to the embodiment of the present disclosure.

Referring now to FIG. 2, an internal configuration of the cellular phone terminal device 100 will be described. In FIG. 2, components the same as those shown in FIG. 1 are denoted by reference numerals the same as those shown in FIG. 1 and redundant description is omitted. The cellular phone terminal device 100 includes an antenna 101 which transmits electric waves to and receives electric waves from a wireless phone base station, a communication processor 102 connected to the antenna 101, and a controller 110. The cellular phone terminal device 100 further includes an audio processor 103, the speaker 104, and a microphone 105.

The communication processor 102 performs wireless communication with the wireless phone base station under control of the controller 110. When a telephone call is made, audio data included in data received by the communication processor 102 is supplied to the audio processor 103. Then the audio processor 103 performs a decoding process on the audio data so as to obtain an analog audio signal. The analog audio signal obtained by the audio processor 103 is supplied to the speaker 104 as audio.

An audio signal collected by the microphone 105 is also supplied to the audio processor 103 which encodes the audio signal in a predetermined encoding method so as to obtain audio data. Then the obtained audio data is supplied to the communication processor 102 and transmitted as a wireless electric wave through the antenna 101.

These processing units such as the communication processor 102 and the audio processor 103 transmit control data to and receive control data from the controller 110 through a control line CL, and further perform transmission of data through a data line DL.

The cellular phone terminal device 100 further includes the display unit 106 and the operation unit 107. Display in the display unit 106 is controlled by the controller 110 and a lock controller 111. The display unit 106 displays information required when a telephone call is made or received, information representing an address of an electric mail and a message, an image obtained through the Internet, information obtained by executing various functions of the cellular phone terminal device 100, and the like. The operation unit 107 including the buttons and the touch panel as described above generates an instruction signal corresponding to content of an operation performed by a user and supplies the instruction signal to the controller 110.

The controller 110 including a microprocessor performs communication control, audio processing, control of the audio processing, image processing, control of the image processing, various signal processes, control of the various units, and the like. To the controller 110, a memory 108 is connected through the control line CL and the data line DL. The memory 108 stores various data required by the cellular phone terminal device 100.

Furthermore, the memory 108 includes regions for a program storage unit 108a and a lock-cancel-activated-application registration unit 108b. The program storage unit 108a stores programs which configure various applications or various functions. The various applications and the various functions stored in the program storage unit 108a are also registered as an activation-available application list L1. The activation-available application list L1 includes applications or functions as a list which are selectable as activation available applications or activation available functions when a lock state is cancelled.

In the lock-cancel-activated-application registration unit 108b, an application or a function which is desired by the user to be displayed in a screen of the display unit 106 when lock is cancelled is registered. In the lock-cancel-activated-application registration unit 108b, among the applications and the functions registered in the activation-available application list L1, an application or a function selected by the user is registered, for example. Examples of the function include an on/off function of a manner mode, Wi-Fi (Wireless Fidelity) connection, Bluetooth (registered trademark) connection, and an on/off function of an electric power. In the lock-cancel-activated-application registration unit 108b, an application frequently used by the user is registered.

Figure 3:
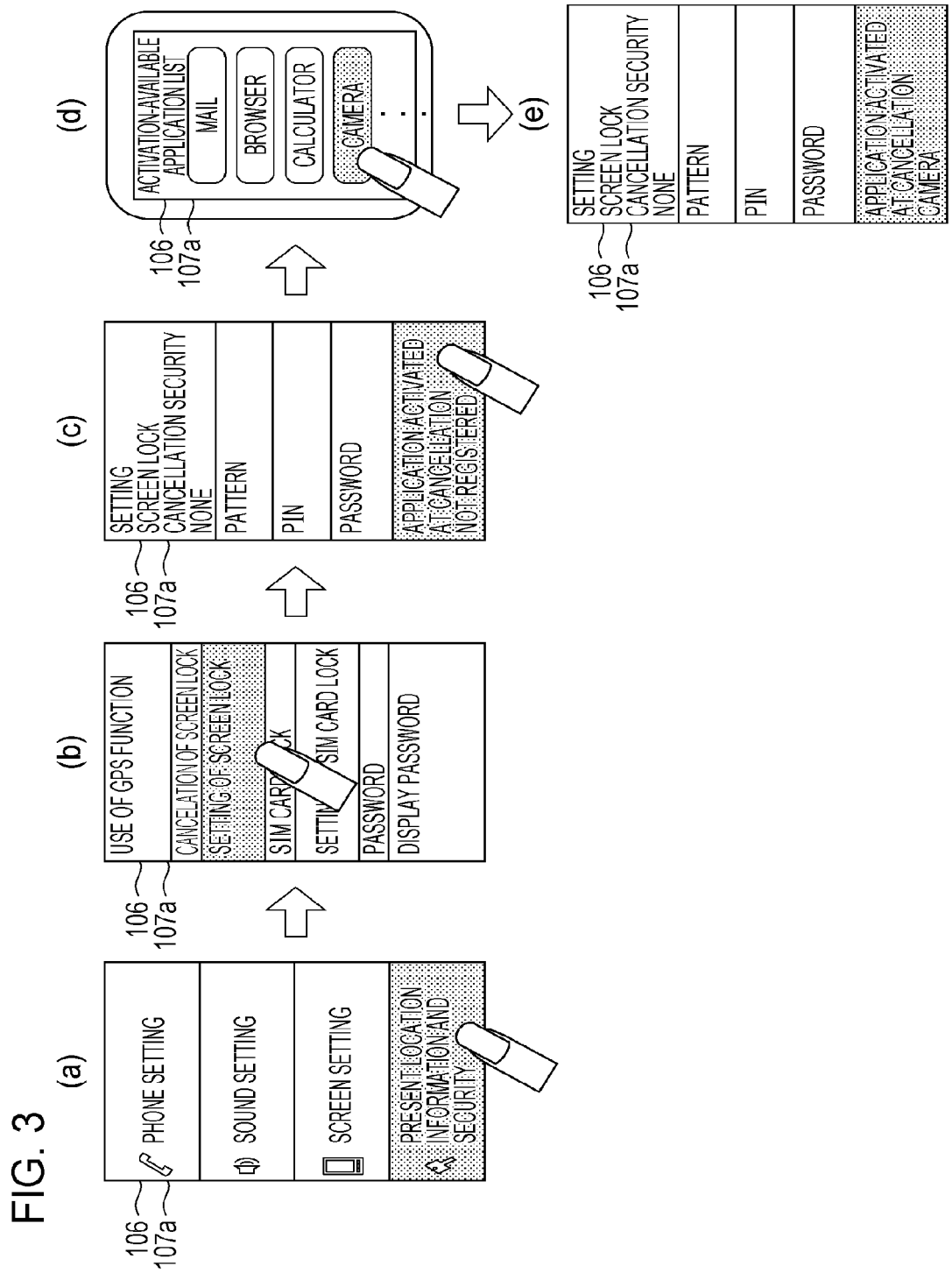
FIG. 3 is an explanatory diagram illustrating screen change of a display unit performed when an application to be activated when a lock state is cancelled is registered according to the embodiment of the present disclosure.

FIG. 3 shows an example of screen change of the display unit 106 performed when the user performs a registration operation using the lock-cancel-activated-application registration unit 108b. In FIG. 3, a case where a function of registering an application or a function to the lock-cancel-activated-application registration unit 108b is included in items included in an item "setting of screen lock" included in an item "present location information and security" which is one of menu items is taken as an example.

First, as shown in FIG. 3(a), when the item "present location information and security" is selected by the user in a state in which a setting screen is displayed in the display unit 106, items in a lower layer of the selected item are displayed as shown in FIG. 3(b). In FIG. 3(b), four items including an item "use of GPS function", an item "setting of screen lock", an item "setting of SIM card lock", and an item of "display password" are displayed. When the item "setting of screen lock" is selected by the user, items in a lower layer of the item are displayed as shown in FIG. 3(c).

In FIG. 3(c), the item "setting of screen lock" includes five items "none", "pattern", "PIN", "password", and "application activated at cancellation" are displayed. The item "application activated at cancellation" is used to set an application or a function desired by the user to be activated simultaneously with cancellation of lock. In the example shown in FIG. 3(c), the item "application activated at cancellation" is represented as "not registered".

When the user selects the item "application activated at cancellation", a screen shown in FIG. 3(d) is subsequently displayed. In the screen shown in FIG. 3(d), text "activation-available application list" is displayed, and in addition, four items "mail", "browser", "calculator", and "camera" are displayed. The applications or the functions stored in the activation-available application list L1 (shown in FIG. 2) are read and displayed in the "activation-available application list".

In an example shown in FIG. 3(d), the item "camera" is selected from the "activation-available application list". Then, as shown in FIG. 3(e), the item "camera" selected from the "activation-available application list" is registered as the item "application activated at cancellation".

Note that, although a case where the user performs a registration of an application or a function to the lock-cancel-activated-application registration unit 108b is taken as an example in the example shown in FIG. 3, the present disclosure is not limited to this. For example, an application or a function which is most frequently activated or used in application activation history, function usage history, and the like may be automatically registered in the lock-cancel-activated-application registration unit 108b.

Referring back to FIG. 2, the cellular phone terminal device 100 includes the lock controller 111 serving as an operation disabling controller. The lock controller 111 includes an operation speed determination unit 111a and an application activation controller 111b serving as an operation controller. The lock controller 111 performs a process of entering a lock state for disabling an input operation so that when the touch panel 107a accidentally contacts to an object, the contact accidentally performed is not mistakenly recognized as a user's input. Shift to the lock state is performed when the user clearly performs a predetermined instruction. Furthermore, the lock controller 111 also controls cancellation of the lock state.

The operation speed determination unit 111a determines whether the speed of the slide operation supplied as the operation information from the touch panel controller 107b is higher than a predetermined threshold value. Then, when the speed is higher than the threshold value, the operation speed determination unit 111a notifies the application activation controller 111b of the fact. As the threshold value set for the speed of the slide operation, an average value of a plurality of sampling values may be set, for example. A determination as to whether only the user of the cellular phone terminal device 100 is selected as a target of the sampling or the user of the cellular phone terminal device 100 and the other users are selected as targets of the sampling may be arbitrarily made by a designer. Furthermore, the threshold value may be automatically optimized in accordance with tendency of user's operations.

When receiving the notification from the operation speed determination unit 111a, that is, when the speed of the slide operation is higher than the threshold value, the application activation controller 111b activates the application set in the lock-cancel-activated-application registration unit 108b. When a "function" is set in the lock-cancel-activated-application registration unit 108b, the function is turned on or off as set in the list.

[2. Example of Processing of Lock Controller]

Figure 4:
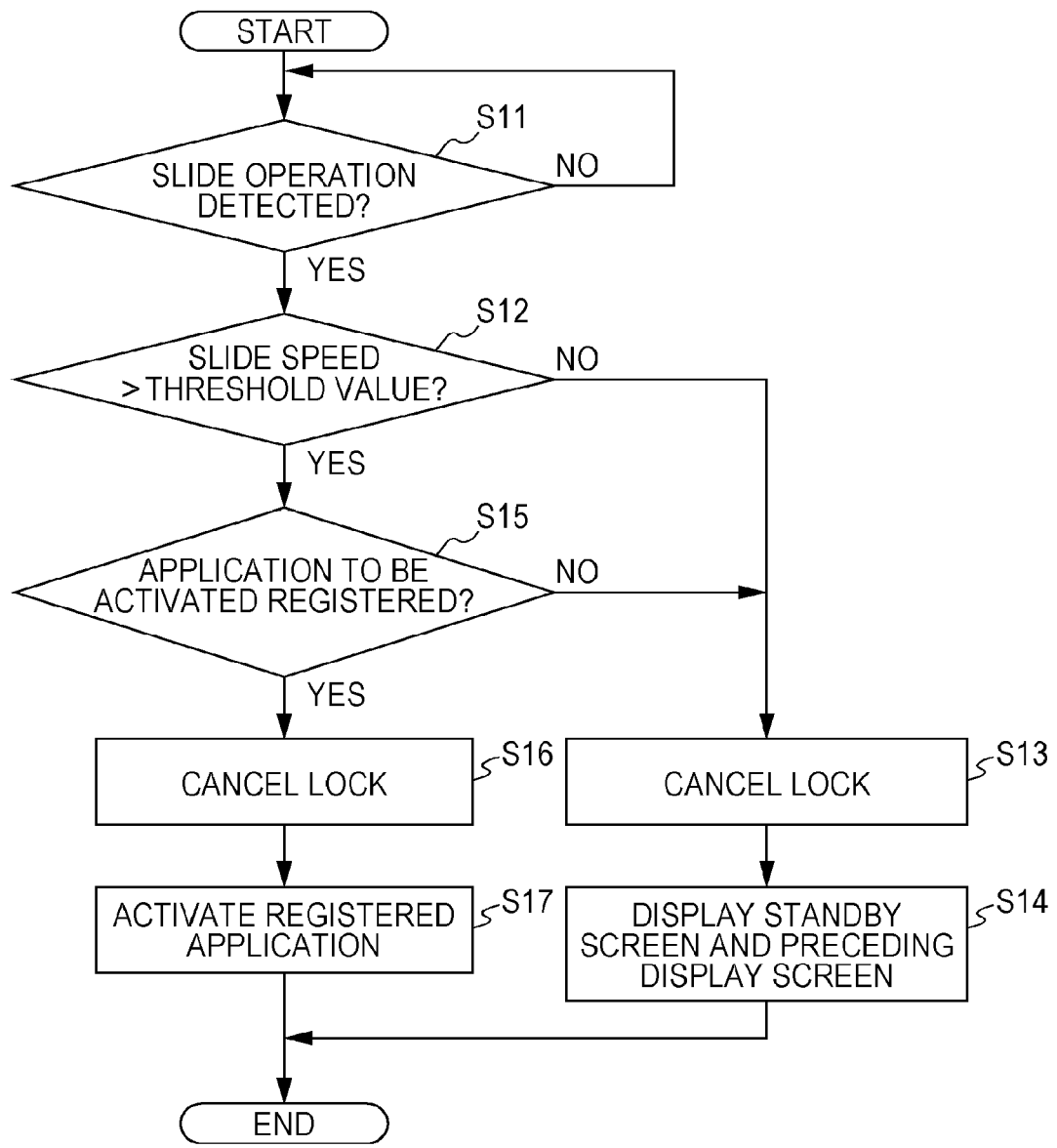
FIG. 4 is a flowchart illustrating a process of a lock controller according to the embodiment of the present disclosure.

Next, referring to FIGS. 4 and 5, a process performed by the lock controller 111 will be described. FIG. 4 is a flowchart illustrating a process performed by the lock controller 111. First, it is determined whether a slide operation is input to the touch panel 107a (refer to FIG. 1) (in step S11). Specifically, it is determined whether a slide operation is detected by the touch panel controller 107b. When the slide operation is detected, subsequently, it is determined whether a speed of the slide operation is higher than the threshold value (in step S12). When the threshold value is not higher than the threshold value, the lock state is cancelled (in step S13) and a standby screen or a preceding display screen is displayed in the display unit 106 (in step S14).

In step S12, when it is determined that the speed of the slide operation is equal to or higher than the threshold value, it is determined whether an application or a function to be activated at lock cancellation has been registered. Specifically, it is determined whether an application or a function has been registered in the lock-cancel-activated-application registration unit 108b (refer to FIG. 2) (in step S15). When an application or a function to be activated at lock cancellation has been registered, the lock state is cancelled (in step S16) and the registered application is activated or the registered function is turned on or off (in step S17).

Figure 5:
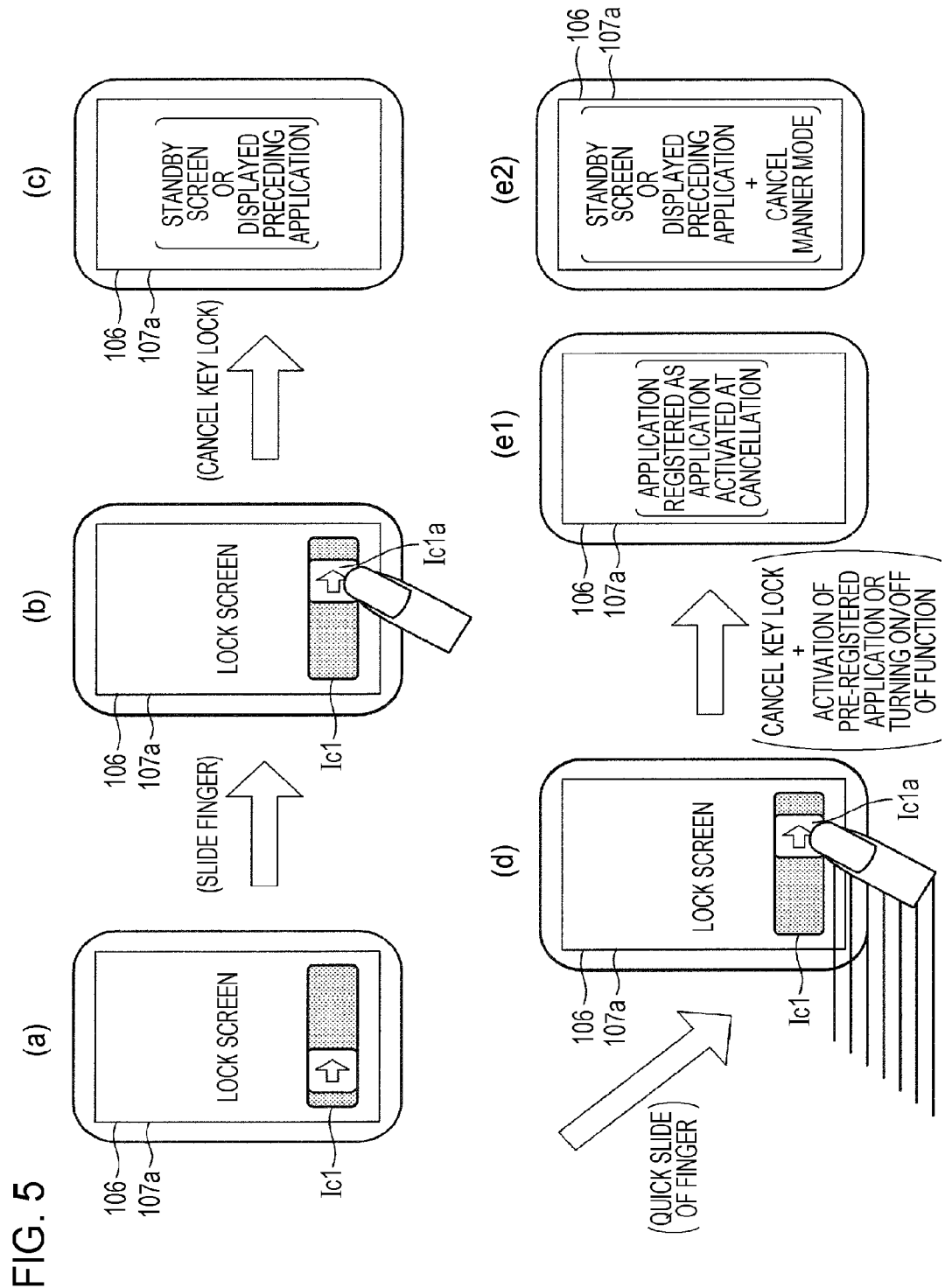
FIG. 5 is an explanatory diagram illustrating screen change performed in accordance with control performed by the lock controller according to the embodiment of the present disclosure.

FIG. 5 is a diagram illustrating screen display of the display unit 106 which changes in accordance with the process described above performed by the lock controller 111. FIG. 5(a) shows a state in which the slide bar Ic1 is displayed in the screen of the display unit 106, that is, the lock state. In this state, when an operation of sliding the icon Ic1a rightward at normal speed is performed (refer to FIG. 5(b)), the lock state is cancelled and the standby state or a preceding application which has been displayed immediately before the lock is displayed as shown in FIG. 5(c).

In the lock state shown in FIG. 5(a), when an operation of quickly sliding the icon Ic1a is performed (refer to FIG. 5(d)), the lock state is cancelled. Simultaneously, as shown in FIG. 5(e1), a screen of the application ("camera") registered as the item "application activated at cancellation" (refer to FIG. 3) is displayed. When the item "cancel manner mode" has been registered in the lock-cancel-activated-application registration unit 108b, for example, the standby screen or the preceding display screen is displayed in the screen of the display unit 106, and in addition, a manner mode is cancelled as shown in FIG. 5(e2).

According to the embodiment of the present disclosure, when the operation of quickly sliding the slide bar Ic1 representing the lock state is performed in the lock state, the lock state is cancelled and an application desired by the user to be used at the cancellation is activated. Alternatively, a predetermined function registered by the user is turned on or off. Specifically, cancellation of the lock state and activation of an application desired to be used or turning on (or off) of a predetermined function may be realized by one step.

Furthermore, according to the embodiment described above, a user's will to "quickly use" a function which is frequently used by the user in general and an action for cancelling a lock state (quick slide operation) are semantically linked. That is, the user may intuitively perform an operation and a user interface having high usability may be provided.

[3. Modifications]

Figure 6:
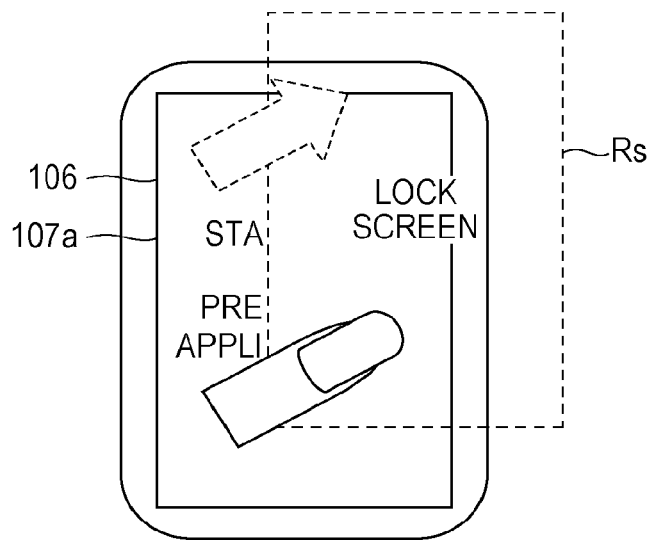
FIG. 6 is an explanatory diagram illustrating a state in which a lock screen representing the lock state is superposed on a standby state or a preceding display screen according to another embodiment of the present disclosure.

Note that, although a case where the slide bar Ic1 is displayed as screen display representing the lock state of the cellular phone terminal device 100 has been taken as an example in the foregoing embodiment, the present disclosure is not limited to this. The present disclosure is applicable to an embodiment in which, as shown in FIG. 6, a lock screen Rs is superposed on a standby screen or a preceding display screen and an operation of flicking the entire lock screen Rs is performed whereby lock is cancelled, for example.

Figure 7:
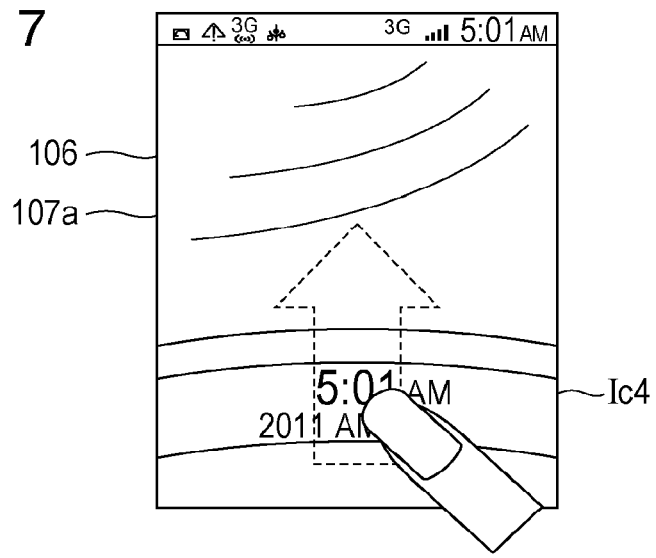
FIG. 7 is an explanatory diagram illustrating a state in which a bar representing the lock state is slid according to still another embodiment of the present disclosure.

Furthermore, the present disclosure is applicable to an embodiment in which, as shown in FIG. 7, instead of slide of the icon Ic1a on the slide bar Ic1, an slide bar Ic4 is slid along with a movement of a finger or an instruction member to thereby cancel a lock state.

Figure 8:
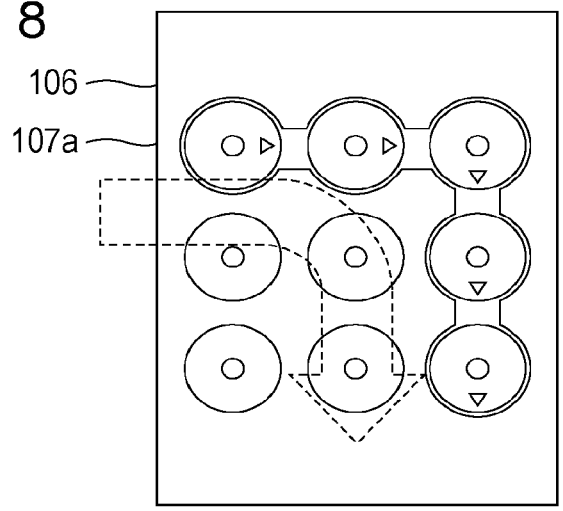
FIG. 8 is an explanatory diagram illustrating a state in which an operation based on a predetermined pattern is performed on a plurality of marks representing the lock state according to a further embodiment of the present disclosure.

Moreover, the present disclosure is applicable to an embodiment in which, as shown in FIG. 8, a lock state is cancelled when a predetermined pattern registered by a user is input. FIG. 8 illustrates a case where an arbitrary pattern can be generated using points (circles) arranged in a matrix of three rows and three columns. The present disclosure is applicable to any embodiment in addition to the examples shown in FIGS. 6 to 8 as long as a lock state is cancelled when a slid operation performed by a user's finger or an instruction member is detected.

Furthermore, although the case where only one application to be activated at lock cancellation or only one function to be turned on or off is registered has been taken as an example in the foregoing embodiment, the present disclosure is not limited to this. For example, as an operation to be performed at lock cancellation, a plurality of operations including an activation of an application and turning on or off of a function may be registered. With this configuration, when lock is cancelled, an operation of activating a mail application and simultaneously cancelling a manner mode may be performed.

Figure 9C:
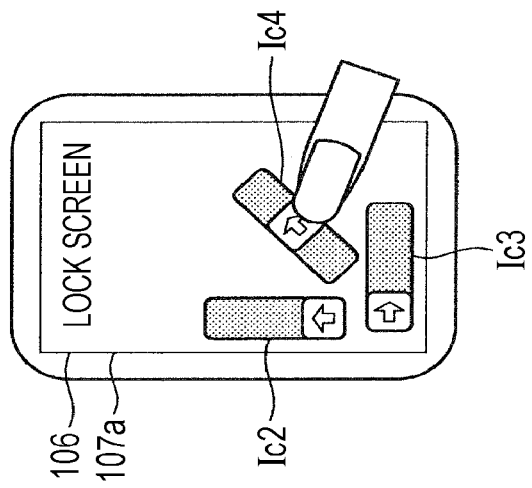
FIGS. 9A, 9B, and 9C are explanatory diagrams illustrating a case where a plurality of slide bars representing the lock state are arranged on a screen according to a still further embodiment of the present disclosure.
Figure 9B:
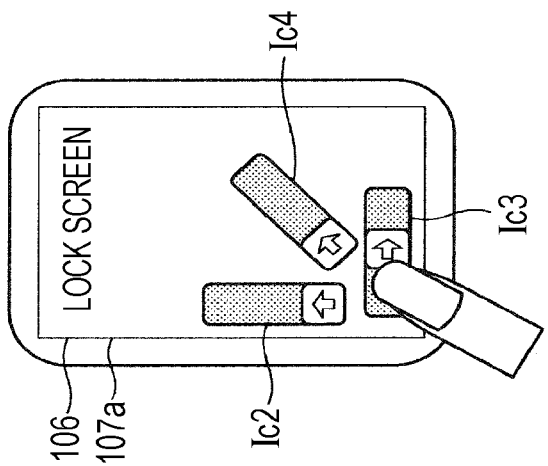
Figure 9A:
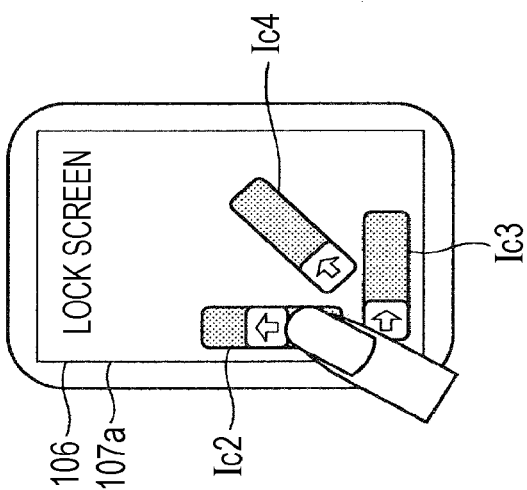

Furthermore, as shown in FIG. 9, a plurality of slide bars representing a lock state may be disposed and different applications or functions may be assigned to the slide bars. FIG. 9 illustrates a case where a slide bar Ic2 which is vertically slid, a slide bar Ic3 which is horizontally slid, and a slide bar Ic4 which is diagonally slid are disposed. For example, an activation of a mail application is assigned to an operation of vertically sliding the slide bar Ic2 shown in FIG. 9(a) and an activation of a browser is assigned to an operation of horizontally sliding the slide bar Ic3 shown in FIG. 9(b). Furthermore, a power-off operation may be assigned to an operation of sliding the slide bar Ic4 in a diagonally upper right direction.

Alternatively, instead of the plurality of slide bars Ic2 to Ic4, different applications or different functions may be assigned to directions of slide operations. In this case, different applications or different functions are assigned to an upward direction, a downward direction, a left direction, and a right direction relative to an icon representing a lock state, for example.

Furthermore, although a determination as to whether cancellation of a lock state is simply performed or an operation of performing lock cancellation plus something extra is performed is made using only a speed of a slide operation performed on the touch panel 107*a* as a parameter as an example in the foregoing embodiment, the present disclosure is not limited to this. In addition to the parameter of a speed of a slide operation used for lock cancellation, a detected inclination of a cellular phone terminal device 100 may be used as a parameter to change an application or a function to be activated after cancellation of a lock state.

Figure 10:
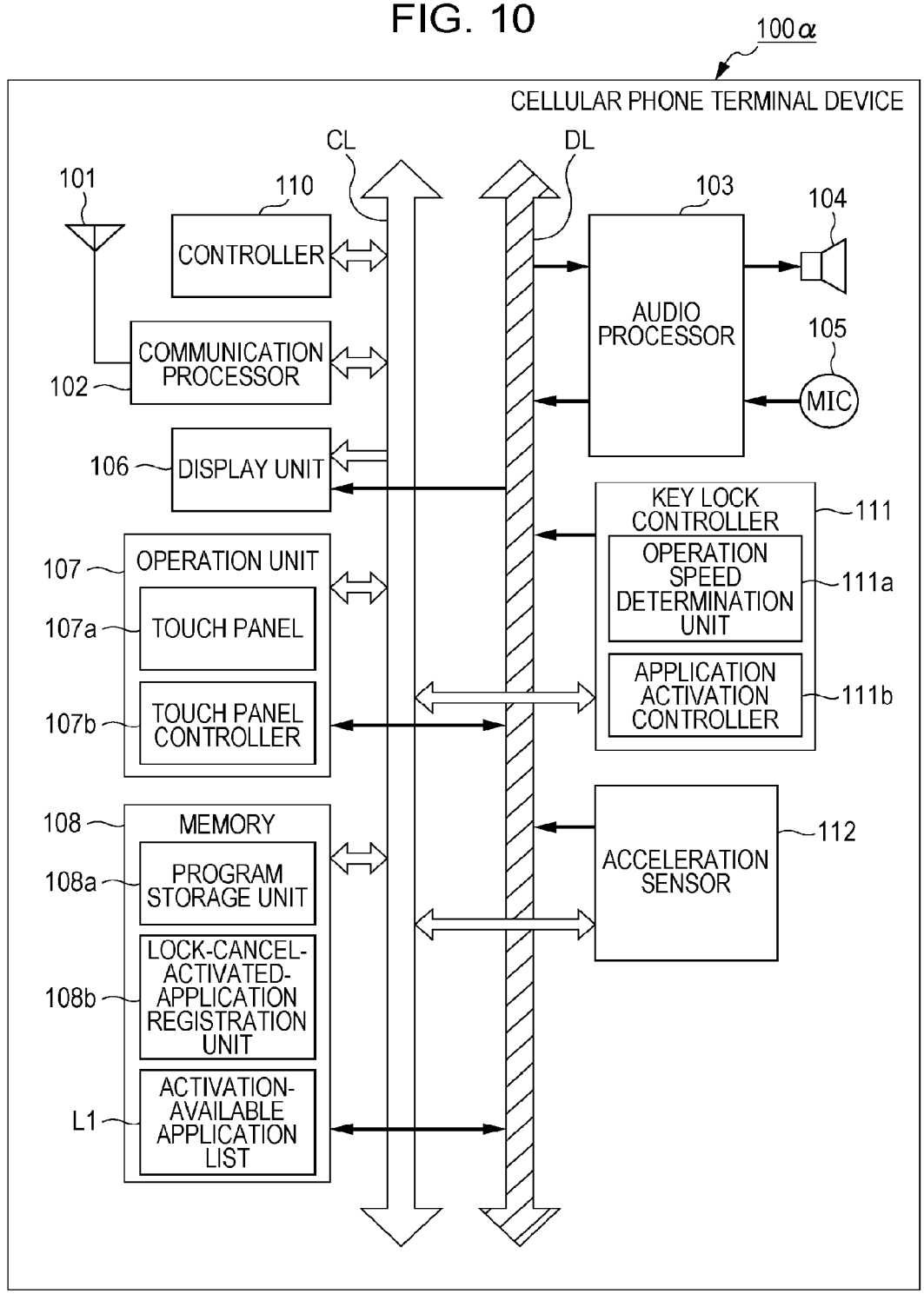
FIG. 10 is a block diagram illustrating an internal configuration of a cellular phone terminal device according to a modification of the present disclosure.

FIG. 10 is a block diagram illustrating an internal configuration of a cellular phone terminal device 100α which performs such a process. The configuration of the cellular phone terminal device 100α is different from that shown in FIG. 2 in that the cellular phone terminal device 100α includes an acceleration sensor 112. In FIG. 10, components the same as those shown in FIG. 2 are denoted by reference numerals the same as those shown in FIG. 2 and redundant description is omitted. The acceleration sensor 112 obtains rotation angles of a plurality of rotation axes having different directions and outputs obtained data to a data line DL. An application activation controller 111*b* of a lock controller 111 reads an application corresponding to an inclination detected by the acceleration sensor 112 from a lock-cancel-activated-application registration unit 108*b* and displays the application in a display unit 106.

In the lock-cancel-activated-application registration unit 108*b*, applications frequently used by a user while the cellular phone terminal device 100α is inclined may be registered. For example, as an application to be displayed when cancellation is performed while the cellular phone terminal device 100α is in a vertical position, an address book or the like is registered, whereas as an application displayed when cancellation is performed in a horizontal position, a game or the like which is used by the user in a state in which the cellular phone terminal device 100*a* is in a horizontal position is registered. Associations between applications and inclination directions may be determined by the user.

FIG. 11 is a diagram illustrating screen change of the display unit 106 when a slide operation is performed to cancel a lock state in a state in which the cellular phone terminal device 100 is held in a vertical position. The state in which the cellular phone terminal device 100 is held in a vertical position represents a state in which an upper surface Sf1 of the cellular phone terminal device 100 shown in FIG. 11(*a*) is horizontally positioned relative to the ground. FIG. 11(*a*) shows a state in which a slide bar Ic1 is displayed in a screen of the display unit 106, that is, a lock state. In this state, when an operation of sliding an icon Ic1*a* rightward at normal speed is performed (refer to FIG. 11(*b*)), the lock state is cancelled, and furthermore, a standby screen or an application displayed in a screen immediately before the lock state is displayed as shown in FIG. 11(*c*).

In the lock state shown in FIG. 11(*a*), when an operation of quickly sliding the icon Ic1*a* is input (refer to FIG. 11(*d*)), the lock state is cancelled. Simultaneously, as shown in FIG. 11(*e*), a screen of an application which is registered as an item "application activated at cancellation" (refer to FIG. 3) and which is associated with lock cancellation in the vertical position is displayed. When an item "calculator" has been registered in a lock-cancel-activated-application registration unit 108*b* as the application to be displayed at lock cancellation in the vertical position, the lock state is cancelled and a calculator application is displayed.

FIG. 12 is a diagram illustrating screen change of the display unit 106 when a slide operation is performed to cancel a lock state in a state in which the cellular phone terminal device 100 is held in a horizontal position. The state in which the cellular phone terminal device 100 is held in a horizontal position represents a state in which the upper surface Sf1 of the cellular phone terminal device 100 is vertically positioned relative to the ground. FIG. 12(*a*) shows a state in which the slide bar Ic1 is displayed in the screen of the display unit 106, that is, a lock state. In this state, when an operation of sliding the icon Ic1*a* upward at normal speed is performed (refer to FIG. 12(*b*)), the lock state is cancelled, and in addition, the standby screen or the application displayed immediately before the lock state is displayed as shown in FIG. 12(*c*).

In the lock state shown in FIG. 12(*a*), when an operation of quickly sliding the icon Ic1*a* is performed (refer to FIG. 12(*d*)), the lock state is cancelled. Simultaneously, as shown in FIG. 12(*e*), a screen of an application which is registered as the item "application activated at cancellation" (refer to FIG. 3) and which is associated with lock cancellation in the horizontal position is displayed. When an item "game" has been registered in the lock-cancel-activated-application registration unit 108*b* as the application to be displayed at lock cancellation in the horizontal position, the lock state is cancelled and a game application is displayed.

By this, only when the user visualizes an application which is generally used by the user in a state in which the cellular phone terminal device 100 is inclined and an operation of cancelling a lock state is performed by controlling a position of the cellular phone terminal device 100, the lock state can be cancelled and a desired application can be activated. Specifically, a will to quickly use an application which is frequently used is semantically linked to an operation of quick slide movement performed for cancellation of the lock, and in addition, an application which is registered in advance and which is generally used by the user in a state in which the cellular phone terminal device 100 is inclined can be activated when the cellular phone terminal device 100 is inclined.

Note that, when a "function" is registered in the lock-cancel-activated-application registration unit 108*b* instead of an application, the similar operation can be executed. The "function" includes turning on or off of a manner mode, Wi-Fi connection, Bluetooth connection, and turning on or off of a power as described above. Furthermore, an application registered as an application to be displayed at cancellation of a lock state or a function and information on a position of the terminal corresponding to the application or the function may be displayed in a lock screen as guide display. The guide display may be performed using an icon or text.

Furthermore, although a case where the acceleration sensor is used as an inclination detector which detects an inclination of the cellular phone terminal device 100 has been taken as an example in the example shown in FIG. 12, the present disclosure is not limited to this. Another sensor such as an angular velocity sensor may be used as long as the sensor can detect an inclination of the cellular phone terminal device 100.

Moreover, in the foregoing embodiment, when a slide operation performed at normal speed is input as an operation for cancelling a lock state, only lock cancellation is performed whereas when a slide operation performed at high speed is input, an operation of lock-state cancellation plus something extra is performed. However, the present disclosure is not limited to this, and different layer states of an application to be activated may be configured for a case where an operation is performed at normal speed and a case where an operation is performed at a speed higher than a predetermined speed.

FIG. 13 is a diagram illustrating screen change of the display unit 106 included in the cellular phone terminal device 100 having this configuration. FIG. 13(*a*) shows a state in which a screen of the display unit 106 is locked. In the display unit 106, a key icon Ic5, a mail icon Ic6 corresponding to the mail application, and a globe icon Ic7 corresponding to a browser application which are displayed when the cellular phone terminal device 100 are in a lock state are displayed.

The icons (the mail icon Ic6 and the globe icon Ic7 in this case) other than the key icon Ic5 are displayed when being selected by the user as applications to be activated at lock cancellation. Furthermore, an icon Ic8 which is represented by a double circle and which is moved in a direction in which a user's finger or an instruction member moves is displayed in the screen of the display unit 106.

When an operation of moving the double circle icon Ic8 toward the key icon Ic5 is performed by the user in a state in which the screen shown in FIG. 13(*a*) is displayed (refer to FIG. 13(*b*)), the lock state is cancelled and a state before the lock state is entered is restored. FIG. 13(*c*) shows a case where the standby screen or a preceding display application is displayed as the state before the lock state is entered.

When an operation of sliding the double circle icon Ic8 toward the mail icon Ic6 at the normal speed is input (refer to FIG. 13(*d*)) in the lock state shown in FIG. 13(*a*), the lock state is cancelled and a home screen of the mail application is displayed as shown in FIG. 13(*e*).

When an operation of quickly sliding the double circle Ic8 toward the mail icon Ic6 is performed (refer to FIG. 13(*f*)) in the lock state shown in FIG. 13(*a*), the lock state is cancelled. Simultaneously, as shown in FIG. 13(*g*), a message generation screen of the mail application is displayed.

With this configuration and the operation, a period of time from when the lock state is cancelled to when a function desired to be used by the user is activated is considerably reduced. Specifically, an application frequently used by the user is quickly displayed in a state in which the application is easily used by the user. That is, a will "I want to quickly send a mail to someone" of the user and the operation of quickly sliding the icon Ic8 are semantically linked to each other.

Note that, although the case where a screen corresponding to a predetermined layer of an application having a layer structure of screen change is displayed when a quick slide operation is performed has been taken as an example in FIG. 13, the present disclosure is not limited to this. For example, an application having a plurality of functions may be provided and the different functions may be activated (executed) depending on a speed of a slide operation. In a case of a camera application, when a slide operation at normal speed is performed, a camera shooting mode may be activated whereas when a slide operation at high speed is performed, a movie shooting mode may be activated.

Furthermore, although the case where only the speed of the slide operation is changed depending on a case where an application is to be simply activated or a case where an application is to be activated in a specific state such as in a specific layer or in a specific function has been taken as an example in FIG. 13, the present disclosure is not limited to this. The two operations may be associated with different operation directions so that the two operations can be more clearly distinguished from each other. For example, when an operation of sliding the icon Ic8 shown in FIG. 13 toward the mail icon Ic6 at normal speed is performed, the mail application is activated. Then, when an operation of quickly sliding the double circle icon Ic8 in a direction in which the icon Ic8 is moved away from the mail icon Ic6 is performed, the message generation screen may be displayed. Furthermore, the same control may be performed without displaying the double circle icon Ic8 which moves along with a movement of the user's finger or the instruction member.

Furthermore, although a case where various processes are executed provided that the cellular phone terminal device 100 is in a lock state has been described in the embodiment and the modifications described hereinabove, the present disclosure is not limited to this. Different applications may be activated depending on a speed of an input slide operation in a normal state which is not the lock state or a layer of an application to be activated may be changed.

Furthermore, although the case where the terminal device of the present disclosure is applied to the cellular phone terminal has been taken as an example in the foregoing embodiment, the present disclosure is not limited to this. The present disclosure is applicable to other terminal devices including a tablet terminal device, a PDA (Personal Digital Assistant), a game machine, and a music/movie reproducing device as long as the terminal device includes the touch panel 107*a*. In any case, the same effects as described above may be obtained.

Note that a series of the processes in the foregoing embodiment may be executed by hardware or software. When the series of the processes is to be executed by software, the series of the processes is executable by a computer having dedicated hardware including a program which configures the software incorporated therein or a computer in which a program used to execute various functions is installed.

Furthermore, a recording medium including a program code of software which realizes the functions of the foregoing embodiment stored therein may be supplied to a system or a device. Moreover, it is apparent that the functions are realized by reading and executing the program code stored in the recording medium using a computer (or a control device such as a CPU) included in the system or the device.

In this case, examples of the recording medium which supplies the program code include a flexible disk, a hard disk, an optical disc, a magneto-optical disc, a CD-ROM, a CD-R, a magnetic tape, a nonvolatile memory card, and a ROM.

The functions of the foregoing embodiment are realized by executing the program code read by the computer. In addition, an OS which operates in the computer performs part of the actual process or the entire actual process in accordance with an instruction of the program code. A case where the functions of the foregoing embodiment are realized by the process is also included in the present disclosure.

Furthermore, in this specification, a processing step which describes time-oriented processes includes not only processes performed in a time series along a described order but also processes executed in parallel or processes individually executed (for example, a parallel process or a process using an object) in addition to the processes performed in a time series.

Furthermore, configurations and processes described in claims in the present disclosure are not limited to the foregoing embodiment. It is apparent for those skilled in the art that various modifications, various combinations, and other embodiments may be made depending on a design or other elements within the scope of the claims and equivalents of the claims.

Note that the present disclosure may be configured as follows.

(1) A terminal device including an operation unit on which an operation instruction is performed by a user's finger or an instruction member, an operation disabling controller which performs control such that the operation instruction performed on the operation unit is disabled or the disabling state is cancelled, an operation detector which outputs, when a touch by the user's finger or the instruction member is detected, content of the operation as operation information, an operation speed determination unit which determines, when the operation detector detects a touch of the user's finger or the instruction member in a state in which the operation instruction input to the operation unit is disabled by the operation disabling controller and when an operation represented by the operation information corresponds to an operation of slidably moving the user's finger or the instruction member on the operation unit, whether a movement speed of the slide movement is higher than a predetermined threshold value, and an operation controller which instructs the operation disabling controller to cancel the disabling state and performs control of the cancellation of the disabling state when it is determined that the movement speed of the slide movement does not satisfy the predetermined threshold value, and which instructs the operation disabling controller to cancel the disabling state and performs control of execution of a predetermined function which is selected from among functions of the terminal device and which is associated in advance with the operation of slide movement performed at the movement speed higher than the threshold value when it is determined that the movement speed of the slide movement satisfies the predetermined threshold value.

(2) The terminal device set forth in the item (1), wherein the operation of slide movement performed at the movement speed higher than the threshold value and the association with the predetermined function selected from among the functions of the terminal device are performed by the user.

(3) The terminal device set forth in the items (1) or (2), wherein the predetermined function is included in the terminal device or realized by an application stored in the terminal device.

(4) The terminal device set forth in any one of the items (1) to (3) further including a display unit which displays an image, wherein the predetermined function is set so as to be associated with a direction of the slide movement, the operation speed determination unit detects the movement direction together with the movement speed of the slide movement, the operation controller performs, when the movement speed of the slide movement detected by the operation speed determination unit in the state in which the operation instruction to the operation unit is disabled is higher than the threshold value, control such that a screen of the predetermined function associated in advance with the movement direction detected by the operation speed determination unit is displayed in the display unit.

(5) The terminal device set forth in any one of the items (1) to (3), wherein a function in a predetermined state of the application is set as the predetermined function, and the operation controller performs, when the movement speed of the slide movement detected by the operation speed determination unit in the state in which the operation instruction input to the operation unit is disabled is higher than the threshold value, control of execution of the function of the application in the predetermined state, and performs, when the movement speed of the slide movement detected by the operation determination unit is not higher than the threshold value, control of restarting of the application.

(6) The terminal device set forth in any one of the items (1) to (3), further including an inclination detector which detects an inclination of the terminal device, wherein the predetermined function is set so as to correspond to the inclination of the terminal device, and the operation controller performs, when the movement speed of the slide movement detected by the operation speed determination unit in the state in which the operation instruction input to the operation unit is disabled is higher than the threshold value, control of execution of the predetermined function which is associated in advance with the inclination of the terminal device detected by the inclination detector.

(7) The terminal device set forth in the item (1) wherein the association between the operation of slide movement performed at the movement speed higher than the threshold value and the predetermined function selected from among the functions of the terminal device is automatically performed in accordance with tendency of operations performed by the user.

(8) An information processing method including a step of detecting a touch by a user's finger or an instruction member performed on an operation unit which allows an operation instruction to be performed by a touch by the user's finger of the instruction member and outputting, when the touch is detected, content of the operation as operation information, a step of determining, when the touch of the user's finger or the instruction member is detected in a state in which the operation instruction input to the operation unit is disabled and when an operation represented by the operation information corresponds to an operation of slidably moving the user's finger or the instruction member on the operation unit, whether a movement speed of the slide movement is higher than a predetermined threshold value, and a step of instructing cancellation of the state in which the operation instruction is disabled when it is determined that the movement speed of the slide movement is not higher than the predetermined threshold value, and instructing cancellation of the state in which the operation instruction is disabled and performing control of execution of a function of the terminal device which is associated in advance with the operation of the slide movement performed at the movement speed higher than the threshold value when it is determined that the movement speed of the slide movement is higher than the predetermined threshold value.

(9) A program which causes a computer to cause a step of detecting a touch by a user's finger or an instruction member performed on an operation unit which allows an operation instruction to be performed by a touch by the user's finger of the instruction member and outputting, when the touch is detected, content of the operation as operation information, a step of determining, when the touch of the user's finger or the instruction member is detected in a state in which the operation instruction input to the operation unit is disabled and when an operation represented by the operation information corresponds to an operation of slidably moving the user's finger or the instruction member on the operation unit, whether a movement speed of the slide movement is higher than a predetermined threshold value, and a step of instructing cancellation of the state in which the operation instruction is disabled when it is determined that the movement speed of the slide movement is not higher than the predetermined threshold value, and instructing cancellation of the state in which the operation instruction is disabled and performing control of execution of a predetermined function which is selected from among functions of the terminal device and which is associated in advance with the operation of the slide movement performed at the movement speed higher than the threshold value when it is determined that the movement speed of the slide movement is higher than the predetermined threshold value.

REFERENCE SIGNS LIST

100: cellular phone terminal device, 101: antenna, 102: communication processor, 103: audio processor, 104: speaker, 105: microphone, 106: display unit, 107: operation unit, 107a: touch panel, 107b: touch panel controller, 108: memory, 108a: program storage unit, 108b: lock-cancel-activated-application registration unit, 110: controller, 111: lock controller, 111a: operation speed determination unit, 111b: application activation controller, 112: acceleration sensor, Ic1 to Ic4: slide bar, Ic1a: icon, Ic1b: bar, Ic5: icon, L1: activation-available application list

What is claimed is:

1. A terminal device, comprising:
a touch panel display configured to display image data and receive an operation instruction performed by an external object; and
circuitry configured to
perform control such that when the terminal device is in a disabled state, the operation instruction performed on the touch panel display is ignored or the disabled state is cancelled,
output, when a touch operation by the external object is detected, content of the touch operation as the operation instruction, and
cancel the disabled state and perform control of execution of a predetermined function when it is determined that the touch operation is an operation instruction to cancel the disabled state and in accordance with movement and speed of the touch operation to move a displayed marker in a direction toward one of a plurality of displayed icons each corresponding to a different predetermined function and at least one of the displayed icons corresponds to a plurality of predetermined functions each one to be executed based on one of different respective movement speeds of the touch operation.

2. The terminal device according to claim 1, wherein the circuitry determines whether a movement speed of the touch operation is higher than a predetermined threshold value, and wherein a first predetermined function corresponding to the displayed icon towards which the marker is moved is executed when the movement speed of the touch operation is higher than the predetermined threshold value, and a second predetermined function corresponding to the displayed icon towards which the marker is moved is executed when the movement speed is equal to or lower than the predetermined threshold value.

3. The terminal device according to claim 1, wherein one of the plurality of displayed icons corresponds to a predetermined function of displaying a standby screen and displaying an application that was previously open before the disabled state was entered.

4. The terminal device according to claim 1, wherein the plurality of displayed icons includes icons corresponding to at least one of an internet browser application, a mail application, and a camera application.

5. The terminal device according to claim 4, wherein when the marker is moved toward a displayed icon corresponding to the mail application, the circuitry determines whether a movement speed of the touch operation is higher than a predetermined threshold value, and a message generation screen corresponding to the mail application is executed when the movement speed of the touch operation is higher than the predetermined threshold value, and a home screen corresponding to the mail application is executed when the movement speed is equal to or lower than the predetermined threshold value.

6. The terminal device according to claim 4, wherein when the marker is moved toward a displayed icon corresponding to the camera application, the circuitry determines whether a movement speed of the touch operation is higher than a predetermined threshold value, and a movie shooting mode corresponding to the camera application is executed when the movement speed of the touch operation is higher than the predetermined threshold value, and camera shooting mode corresponding to the camera application is executed when the movement speed is equal to or lower than the predetermined threshold value.

7. A method, implemented on a terminal device having a touch panel display configured to display image data, comprising:
receiving, at the touch panel display, an operation instruction performed by an external object;
performing control such that when the terminal device is in a disabled state, the operation instruction performed on the touch panel display is ignored or the disabled state is cancelled;
outputting, when a touch operation by the external object is detected, content of the touch operation as the operation instruction; and
cancelling the disabled state and perform control of execution of a predetermined function when it is determined that the touch operation is an operation instruction to cancel the disabled state and in accordance with movement and speed of the touch operation to move a displayed marker in a direction toward one of a plurality of displayed icons each corresponding to a different predetermined function and at least one of the displayed icons corresponds to a plurality of predetermined functions each one to be executed based on one of different respective movement speeds of the touch operation.

8. The method according to claim 7, further comprising:
determining whether a movement speed of the touch operation is higher than a predetermined threshold value, and wherein a first predetermined function corresponding to the displayed icon towards which the marker is moved is executed when the movement speed of the touch operation is higher than the predetermined threshold value and a second predetermined function corresponding to the displayed icon towards which the marker is moved is executed when the movement speed is equal to or lower than the predetermined threshold value.

9. The method according to claim 7, wherein one of the plurality of displayed icons corresponds to a predetermined function of displaying a standby screen and displaying an application that was previously open before the disabled state was entered.

10. The method according to claim 7, wherein the plurality of displayed icons includes icons corresponding to at least one of an internet browser application, a mail application, and a camera application.

11. The method according to claim 10, wherein when the marker is moved toward a displayed icon corresponding to the mail application, the method includes determining whether a movement speed of the touch operation is higher than a predetermined threshold value, and a message generation screen corresponding to the mail application is executed when the movement speed of the touch operation is higher than the predetermined threshold value, and a home screen corresponding to the mail application is executed when the movement speed is equal to or lower than the predetermined threshold value.

12. The method according to claim 10, wherein when the marker is moved toward a displayed icon corresponding to the camera application, the method includes determining whether a movement speed of the touch operation is higher than a predetermined threshold value, and a movie shooting mode corresponding to the camera application is executed when the movement speed of the touch operation is higher than the predetermined threshold value, and camera shooting mode corresponding to the camera application is executed when the movement speed is equal to or lower than the predetermined threshold value.

13. A non-transitory computer readable medium including computer executable instructions, wherein the instructions, when executed by a terminal device having a touch panel display configured to display image data, cause the terminal device to perform a method comprising:
   receiving, at the touch panel display, an operation instruction performed by an external object;
   performing control such that when the terminal device is in a disabled state, the operation instruction performed on the touch panel display is ignored or the disabled state is cancelled;
   outputting, when a touch operation by the external object is detected, content of the touch operation as the operation instruction; and
   cancelling the disabled state and perform control of execution of a predetermined function when it is determined that the touch operation is an operation instruction to cancel the disabled state and in accordance with movement and speed of the touch operation to move a displayed marker in a direction toward one of a plurality of displayed icons each corresponding to a different predetermined function and at least one of the displayed icons corresponds to a plurality of predetermined functions each one to be executed based on one of different respective movement speeds of the touch operation.

14. The non-transitory computer readable medium according to claim 13, the method further comprising:
   determining whether a movement speed of the touch operation is higher than a predetermined threshold value, and wherein a first predetermined function corresponding to the displayed icon towards which the marker is moved is executed when the movement speed of the touch operation is higher than the predetermined threshold value and a second predetermined function corresponding to the displayed icon towards which the marker is moved is executed when the movement speed is equal to or lower than the predetermined threshold value.

15. The non-transitory computer readable medium according to claim 13, wherein one of the plurality of displayed icons corresponds to a predetermined function of displaying a standby screen and displaying an application that was previously open before the disabled state was entered.

16. The non-transitory computer readable medium according to claim 13, wherein the plurality of displayed icons includes icons corresponding to at least one of an internet browser application, a mail application, and a camera application.

17. The non-transitory computer readable medium according to claim 16, wherein when the marker is moved toward a displayed icon corresponding to the mail application, the method includes determining whether a movement speed of the touch operation is higher than a predetermined threshold value, and a message generation screen corresponding to the mail application is executed when the movement speed of the touch operation is higher than the predetermined threshold value, and a home screen corresponding to the mail application is executed when the movement speed is equal to or lower than the predetermined threshold value.

18. The non-transitory computer readable medium according to claim 16, wherein when the marker is moved toward a displayed icon corresponding to the camera application, the method includes determining whether a movement speed of the touch operation is higher than a predetermined threshold value, and a movie shooting mode corresponding to the camera application is executed when the movement speed of the touch operation is higher than the predetermined threshold value, and camera shooting mode corresponding to the camera application is executed when the movement speed is equal to or lower than the predetermined threshold value.

* * * * *